(12) United States Patent
Teufel et al.

(10) Patent No.: US 7,780,235 B2
(45) Date of Patent: Aug. 24, 2010

(54) VEHICLE SEAT, IN PARTICULAR MOTOR VEHICLE SEAT

(75) Inventors: Ingo Teufel, Rockenhausen (DE); Hans Edrich, Heltersberg (DE); Kai Schumann, Rieschweiler-Mühlbach (DE)

(73) Assignee: RECARO GmbH & Co. KG, Kirchheim/Teck (DE)

( * ) Notice: Subject to any disclaimer, the term of this patent is extended or adjusted under 35 U.S.C. 154(b) by 1 day.

(21) Appl. No.: 12/132,838

(22) Filed: Jun. 4, 2008

(65) Prior Publication Data

US 2008/0303330 A1 Dec. 11, 2008

(30) Foreign Application Priority Data

Jun. 5, 2007 (DE) .................. 10 2007 026 600

(51) Int. Cl.
A47C 1/00 (2006.01)
B60N 2/00 (2006.01)

(52) U.S. Cl. .................. 297/344.15; 297/344.17

(58) Field of Classification Search ............ 297/344.15, 297/344.17, 361, 361.1; 248/396, 421
See application file for complete search history.

(56) References Cited

U.S. PATENT DOCUMENTS

| | | | | |
|---|---|---|---|---|
| 4,470,318 A | * | 9/1984 | Cremer et al. ............... 74/353 |
| 4,505,514 A | * | 3/1985 | Stockl et al. ................. 297/322 |
| 4,652,049 A | | 3/1987 | Maruyama et al. |
| 4,993,678 A | * | 2/1991 | Easter ........................ 248/371 |
| 5,022,707 A | * | 6/1991 | Beauvais et al. ............ 297/216.2 |
| 5,676,424 A | * | 10/1997 | Winkelhake ................ 297/337 |
| 5,709,363 A | * | 1/1998 | Matsuhashi ................. 248/421 |
| 5,806,824 A | * | 9/1998 | Isomura et al. ............. 248/396 |
| 6,361,109 B1 | * | 3/2002 | Tokarz et al. ............... 297/344.15 |
| 6,386,631 B1 | * | 5/2002 | Masuda et al. ............. 297/216.1 |
| 6,398,307 B1 | * | 6/2002 | Schmidt et al. ............. 297/344.17 |
| 6,502,799 B2 | * | 1/2003 | Lepaule ...................... 248/423 |
| 6,550,863 B2 | * | 4/2003 | Dill et al. .................... 297/322 |
| 6,626,064 B1 | * | 9/2003 | Maue et al. ................. 74/665 F |
| 7,104,601 B2 | * | 9/2006 | Masuda et al. ............. 297/216.1 |
| 7,172,251 B2 | * | 2/2007 | Takata et al. ............... 297/344.15 |
| 7,404,602 B2 | * | 7/2008 | Okada et al. ............... 297/284.11 |

FOREIGN PATENT DOCUMENTS

| | | |
|---|---|---|
| DE | 17 80 520 | 4/1972 |
| DE | 197 54 962 C1 | 5/1999 |
| DE | 101 35 857 | 11/2002 |
| EP | 1 010 572 | 6/2000 |
| EP | 1 176 048 B1 | 1/2002 |
| FR | 2 508 298 | 12/1982 |
| JP | 59 130746 | 7/1984 |

* cited by examiner

*Primary Examiner*—David Dunn
*Assistant Examiner*—Erika Garrett
(74) *Attorney, Agent, or Firm*—McGlew and Tuttle, P.C.

(57) ABSTRACT

A vehicle seat (1), in particular a motor vehicle seat, is provided including a seat substructure (5), a seat cushion (31, 33) with a seat shell (31) and an inclination adjuster (21) with a drive (43). The inclination adjuster (21) with drive (43) is used to change the inclination of the seat cushion relative to the seat substructure (5). The inclination adjuster (21) is loosely positioned on the seat substructure (5) or on the seat cushion (31, 33) and movably attached to the other respective sub-assembly.

18 Claims, 2 Drawing Sheets

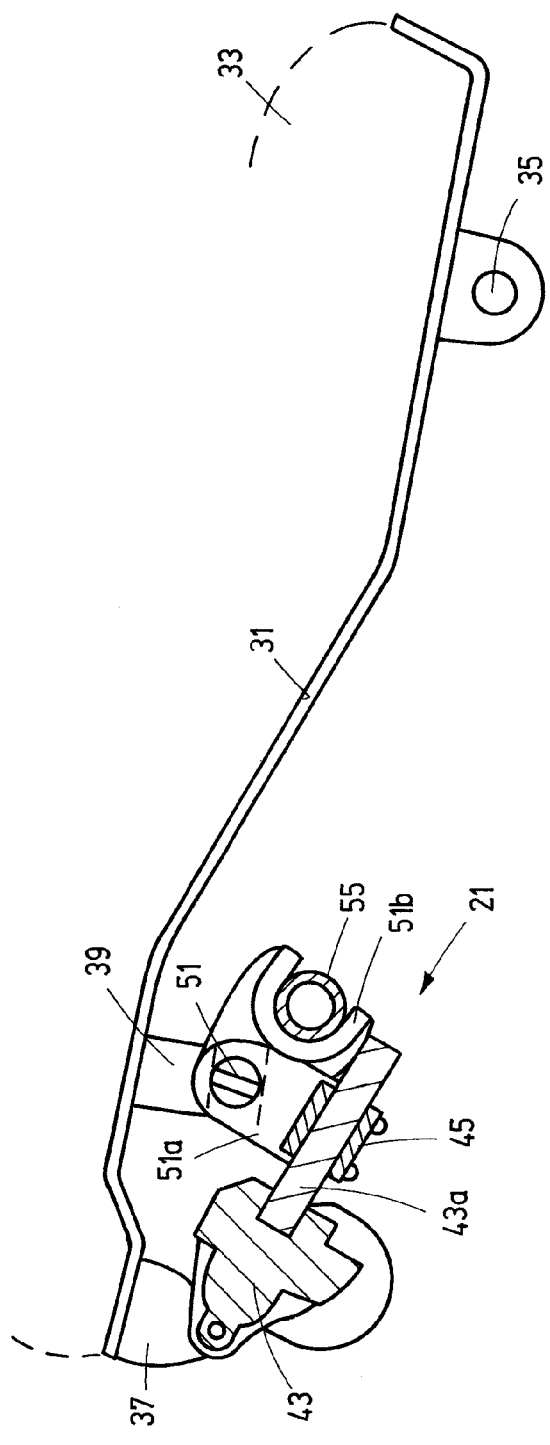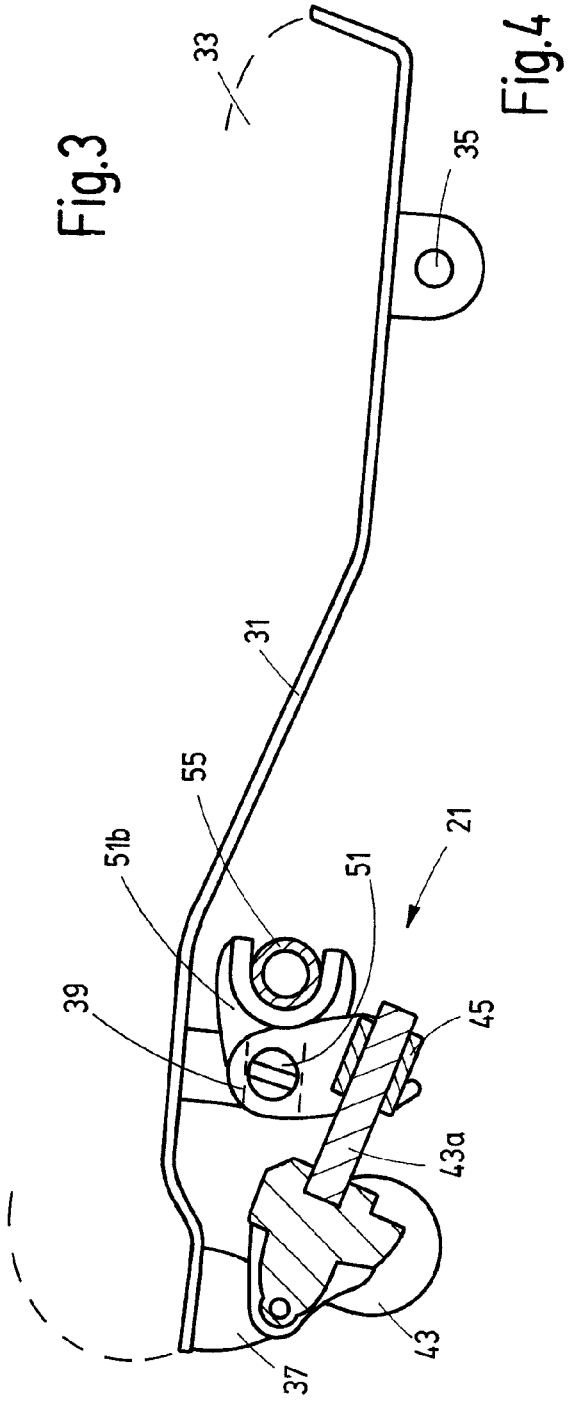

VEHICLE SEAT, IN PARTICULAR MOTOR VEHICLE SEAT

CROSS REFERENCE TO RELATED APPLICATIONS

This application claims the benefit of priority under 35 U.S.C. §119 of German Patent Application DE 10 2007 026 600.8 filed Jun. 5, 2007, the entire contents of which are incorporated herein by reference.

FIELD OF THE INVENTION

The invention relates to a vehicle seat, in particular a motor vehicle seat including a seat substructure, a seat cushion comprising a seat shell and an inclination adjuster comprising a drive for adjusting an inclination of the seat cushion relative to the seat substructure.

BACKGROUND OF THE INVENTION

In the vehicle seat of this type known from EP 1 176 048 B1, the inclination adjuster is provided between a fixed part of a seat frame associated with the seat substructure and a front part of the seat frame which is pivotable relative thereto. The seat shell is articulated at the front to the pivotable part and rests in the region of the hip point by means of a rotary thrust bearing on the fixed part of the seat frame. The movement of the pivotable part of the seat frame raises or lowers the seat shell at the front, so that overall the inclination of the seat shell is altered. It is a drawback that such a seat frame may only be used for incline-adjustable vehicle seats. A variant of the vehicle seat without inclination adjustment of the seat shell thus requires marked alterations to the seat structure.

SUMMARY OF THE INVENTION

The object of the invention is to improve a vehicle seat of the aforementioned type.

According to the invention, a vehicle seat, and in particular a motor vehicle seat is provided comprising a seat substructure, a seat cushion comprising a seat shell and an inclination adjuster comprising a drive for adjusting an inclination of the seat cushion relative to the seat substructure. The inclination adjuster is loosely positioned on one of the seat substructure or on the seat cushion and is movably attached to the other one of the seat substructure or on the seat cushion.

The seat cushion, in a region at or near a hip point of the passenger, is movably attached to the seat substructure in a suspended or articulated manner.

A rotary thrust bearing may be provided wherein the inclination adjuster is movably attached to the seat shell of the seat cushion by means of the rotary thrust bearing.

The inclination adjuster may comprise a shaft aligned in a transverse direction of the vehicle seat. The shaft ends may be mounted in the rotary thrust bearing. A drive lever may be fixedly attached to the shaft, wherein the shaft is rotatable by means of the drive lever.

A fork or lift lever may be fixedly attached to the shaft. The seat substructure may include a transverse tube aligned in the transverse direction of the seat. The shaft may be loosely positioned on the transverse tube by means of the fork being pivotable about the transverse tube.

The drive of the inclination adjuster may include a spindle as an output shaft and a spindle nut located on the spindle. The spindle nut may be rotatably mounted on the drive lever. The drive may be pivotably mounted on the seat shell of the seat cushion by means of at least one drive bearing.

As the inclination adjuster is loosely positioned on the seat substructure or on the seat cushion and is movably attached to the other respective sub-assembly, the inclination adjuster may be inserted between the sub-assemblies without alterations, or without substantial alterations, to the construction of the seat substructure and/or the seat cushion, more specifically the support thereof (for example the seat shell). Thus it is possible both for the vehicle seat to be initially equipped in a modular manner with or without inclination adjustment of the seat cushion and for the seat substructures without inclination adjustment of the seat cushion to be retrofitted. The term "loose" as used with regard to the loosely positioned inclination adjuster, is intended to be understood as a bearing arrangement in which, instead of the conventional restriction of a degree of freedom, for example with pivot bearings restricting the radial degree of freedom, the degree of freedom is only partially restricted, for example only restricted in one of its two possible directions but in the opposite direction thereto is free of restriction. Typical examples might be a positive connection which is unsecured per se or half-open bearing shells of pivot bearings without specific securing of the bearing arrangement per se. The securing of the loose bearing arrangement is preferably carried out "geometrically", for example in that such components are only able to be moved away from one another beyond specific angular positions between the loosely mounted components, the angular positions however not being reached during use. This is not intended to exclude the case, however, where a specific securing of the loose bearing arrangement is provided at a distance from the bearing point.

Various advantageous detailed embodiments, for example the modular construction, simple and—in particular on the seat shell—premountable components, identical parts in left-hand and right-hand vehicle seats, a shaft as a central multifunctional drive and support component of the inclination adjuster, a rotary thrust bearing as geometry compensation and anti-derail device, a pivot bearing of the seat cushion, in particular in the region of the H-point (hip point) and the pivotable bearing arrangement of the drive of the inclination adjuster, preferably a spindle-spindle nut system, may be implemented individually or in combination. A motor or a manual unit may be provided, for example a stepping mechanism, as a drive of the inclination adjuster. The drive may be linear or rotary. The term "motor" is also intended to be understood in the present case as motor-gear units known per se.

The shaft preferably provided as a central, multifunctional drive and support component of the inclination adjuster may be driven by the drive. The shaft is, for example, mounted on the seat cushion, preferably loosely mounted and also is positioned loosely on the seat substructure, for example by means of at least one fork, which is preferably fixedly attached to the shaft, and is loosely positioned on a transverse tube of the seat substructure aligned parallel to the shaft, the fork being pivotable about the transverse tube.

The invention is described in more detail hereinafter with reference to an embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the drawings:

FIG. 3 is a longitudinal sectional view through a part of the embodiment according to the invention with the seat cushion inclined to a maximum extent; and FIG. 4 is a longitudinal sectional view corresponding to FIG. 3 with the seat cushion inclined to a minimum extent.

DESCRIPTION OF THE PREFERRED EMBODIMENT

Figures 1, 2:
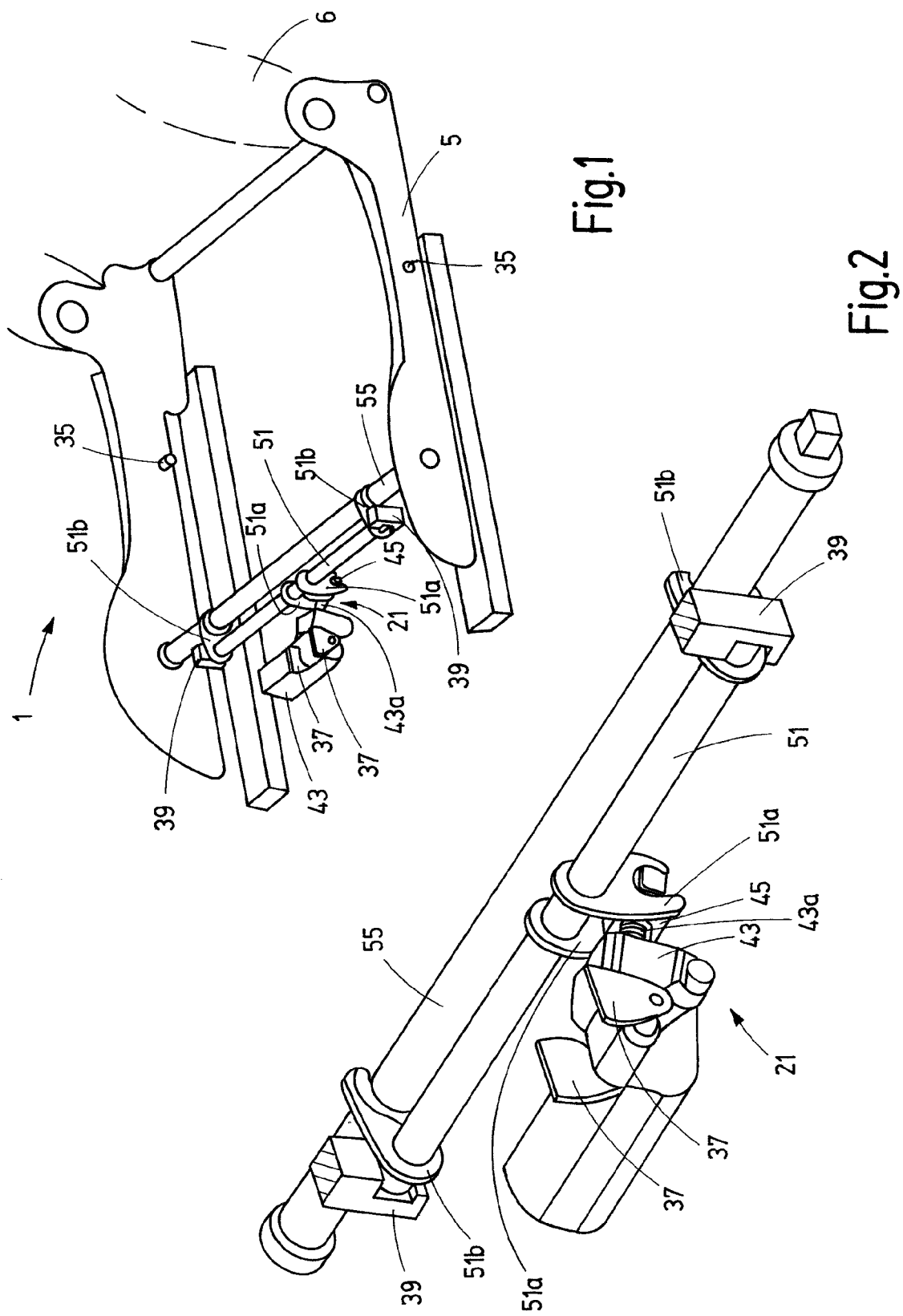
FIG. 1 is a partially schematic perspective view of the embodiment according to the invention without the seat cushion and with a backrest indicated.
FIG. 2 is a perspective view of the inclination adjuster according to the invention.

Referring to the drawings in particular, in the present case, a vehicle seat 1 is provided as a front seat of a motor vehicle, the arrangement of the vehicle seat 1 inside the motor vehicle and the usual direction of travel thereof defining some of the subsequently used directional information, in particular the transverse direction of the seat, which runs perpendicular to the direction of travel and horizontally. The vehicle seat 1 comprises, as a supporting structure of its seat part, a seat substructure 5, the details thereof in the present case not being important and to which the backrest 6 is pivotably attached, an inclination adjuster 21 and a seat shell 31, which carries the seat upholstery 33. The seat shell 31 and the seat upholstery 33 together define the seat cushion. The inclination of the seat shell 31 and thus of the seat cushion may be adjusted by means of the inclination adjuster 21.

The seat shell 31 is articulated to the substructure 5 in the region of its rear end, preferably below the H-point of the passenger, by means of two pad bearings 35 which are in alignment with one another and define a pivot axis extending in the transverse direction of the seat. In the region of its front end, the seat shell 31 is mounted on the inclination adjuster 21 by means of two drive bearings 37 and two shaft bearings 39. The inclination adjuster 21 comprises a drive 43, in the present case a lifting spindle motor, the output shaft thereof being configured as a spindle 43a, and which is mounted pivotably on the drive bearings 37 about an axis extending in the transverse direction of the seat. The inclination adjuster 21 further comprises a spindle nut 45, which is screwed to the spindle 43a and which is rotatably mounted laterally on, or more precisely in, one respective drive lever 51a about an axis extending in the transverse direction of the seat.

The inclination adjuster 21 further comprises a shaft 51 which is aligned in the transverse direction of the seat and which is mounted at the ends in the shaft bearings 39. The shaft bearings 39 serve as rotary thrust bearings, i.e. the shaft 51 is rotatable in the shaft bearings 39 about a pivot lift axis and may be displaced perpendicular to the transverse direction of the seat in a direction predetermined by the shaft bearings 39. The shaft 51 is thus loosely mounted on the seat shell 31. The two drive levers 51a are fixedly attached, and in the present case welded, centrally onto the shaft 51. Similarly, at least one respective fork or lift lever 51b is fixedly attached, in the present case welded, onto the shaft 51 in the region of the two shaft bearings 39. The forks 51b are positioned loosely on a transverse tube 55 which is a component of the seat substructure 5 and extends in the transverse direction of the seat, the forks 51b forming a pivot bearing about the transverse tube 55. The drive levers 51a and the forks 51b, viewed in the peripheral direction of the shaft 51, project from the shaft 51, offset to one another by slightly less than 90°.

The kinematics of the inclination adjuster 21 take place substantially in the plane extending perpendicular to the transverse direction of the seat. The spindle 43a is located in this plane. With a rotation thereof the spindle nut 45 is displaced relative to the drive 43. The displacement of the spindle nut 45 is carried out with a component in a manner which is tangential to the shaft 51 and thus causes a rotation of the shaft 51 about its own axis. The loose mounting of the shaft 51 in the shaft bearings 39 leads to a movement of the forks 51b about the transverse tube 55, which moves the shaft 51 with the shaft bearings 39 substantially in the vertical direction and as a result the seat shell 31 is lifted or lowered at this point. Due to the articulation of the seat shell 31 by means of the pad bearings 35 on the seat substructure 5 remote from the shaft bearing 39, the substantially vertical movement of the shaft bearings 39 leads to an alteration of the inclination of the seat shell 31 and thus of the seat cushion relative to the seat substructure 5. Additionally it might be mentioned that inside the inclination adjuster 21 a geometric compensation of the drive movement takes place, as a result of the rotatable mounting of the drive 43 in the drive bearing 37 and that of the spindle nut 45 in the drive lever 51a as well as the thrust bearing arrangement of the shaft 51 in the shaft bearing 39.

The inclination adjuster 21 is an attachment or an intermediate sub-assembly, which is movably attached to the seat cushion, in the present case by means of a thrust joint and a rotary joint, and is loosely positioned on the seat substructure 5 or attached thereto, without the associated interface having to be appreciably altered. The inclination adjuster 21 may, therefore, be a component of a modular system, in which it replaces a rigid attachment of the seat shell 31 on the transverse tube 55 (approximately in the region of the shaft bearing 39) if required. In a modified embodiment, the inclination adjuster 21 is movably attached to the seat substructure 5, and the seat shell 31 (and thus the seat cushion) are—preferably at the front—loosely positioned on the inclination adjuster 21 or placed thereon and—preferably to the rear in the region of the hip point—movably attached to the seat substructure 5, for example suspended or articulated. The movable attachment of the seat shell 31 on the seat substructure 5, provided in the rear region, ensures the loose bearing point of the inclination adjuster 21 provided in the front region.

While a specific embodiment of the invention has been shown and described in detail to illustrate the application of the principles of the invention, it will be understood that the invention may be embodied otherwise without departing from such principles.

What is claimed is:

1. A vehicle seat comprising:
a seat substructure including a transverse member arranged in a transverse direction of the vehicle seat;
a seat cushion comprising a seat shell, said seat shell being pivotally connected to said seat substructure;
an inclination adjuster arranged between said seat cushion and said seat substructure, said inclination adjuster including a shaft rotatably mounted in said seat cushion and arranged substantially parallel to said transverse member, said inclination adjuster including a lift lever having a first end fixed to said shaft, said lift lever having a second end spaced from said first end, said second end of said lift lever being in contact with, and movable on, said transverse member to incline said seat cushion relative to said seat substructure when the shaft is rotated, said second end of said lift lever being rotatable on said transverse member, said inclination adjuster including a drive lever having a first end fixed to said shaft, said drive lever having a second end spaced from said first end, said inclination adjuster including a drive moving said second end of said drive lever to cause rotation of said shaft about a longitudinal axis of said shaft.

2. A vehicle seat according to claim 1, wherein the seat cushion, in a region at or near a hip point of a passenger, is movably attached to said seat substructure in a suspended or articulated manner.

3. A vehicle seat according to claim 1, wherein said inclination adjuster is loosely positioned by a rotary thrust bearing in side parts of said seat substructure, wherein said inclination adjuster is movably attached to said seat shell of said seat cushion by means of said rotary thrust bearing.

4. A vehicle seat according to claim 3, wherein said shaft of said inclination adjuster extends in a transverse direction of the vehicle seat wherein the shaft has ends mounted in said rotary thrust bearing.

5. A vehicle seat according to claim 4, further comprising a drive lever fixedly attached to said shaft, wherein said shaft is rotatable by means of said drive lever.

6. A vehicle seat according to claim 5, wherein said drive of said inclination adjuster includes a spindle as an output shaft and a spindle nut located on said spindle.

7. A vehicle seat according to claim 6, wherein said spindle nut is rotatably mounted on the drive lever.

8. A vehicle seat according to claim 7, wherein said drive is pivotably mounted on said seat shell of said seat cushion by means of at least one drive bearing.

9. A vehicle seat according to claim 1, wherein said shaft of said inclination adjuster and said transverse tube are aligned in a transverse direction of the vehicle seat.

10. A vehicle seat in accordance with claim 1, wherein:
said seat substructure includes first and second side parts extending in a longitudinal direction of the vehicle seat, said first and second side parts being spaced from each other;
said transverse member extends between said first and second parts of said seat substructure.

11. A vehicle seat according to claim 1, wherein:
said drive is pivotally mounted on said seat shell of said seat cushion, and moves with said seat cushion relative to said seat substructure.

12. A vehicle seat in accordance with claim 1, wherein:
said shaft is rotatably mounted in said seat cushion in a bearing, said bearing restricting radial movement of said shaft in one radial direction of said shaft, said bearing allowing radial movement of said shaft in another radial direction of said shaft.

13. A vehicle seat comprising:
a seat substructure;
a seat cushion comprising a seat shell, said seat shell being pivotally connected to said seat substructure;
an inclination adjuster comprising a drive for adjusting an inclination of said seat cushion relative to said seat substructure, said inclination adjuster having first and second ends;
a bearing arrangement for pivotally connecting said first end of said inclination adjuster to at least one of said seat substructure and said seat cushion about a pivot lift axis, said bearing arrangement restricting radial freedom of movement of said first end of said inclination adjuster relative to said at least one of said seat substructure and said seat cushion in at least one radial direction with respect to said pivot lift axis, said bearing arrangement allowing radial freedom of movement of said inclination adjuster relative to said at least one of said seat substructure and said seat cushion in at least another radial direction with respect to said pivot lift axis; and
a movable attachment for movably attaching said second end of said inclination adjuster to the other of said seat substructure or on said seat cushion.

14. A vehicle seat according to claim 13, wherein said drive is pivotably mounted on said seat shell of said seat cushion by means of at least one drive bearing.

15. A vehicle seat according to claim 13, wherein said bearing arrangement includes:
a rotary thrust bearings wherein said inclination adjuster is movably attached to said seat shell of said seat cushion via said rotary thrust bearings and
fork bearings wherein said inclination adjuster is movably attached to said seat substructure via said fork bearings and wherein said at least one direction of each of said rotary thrust bearings and said fork bearings is the same direction in a state just after said inclination adjuster is attached to said seat shell of said seat cushion and said seat substructure.

16. A vehicle seat according to claim 15, further comprising a drive lever, wherein
said inclination adjuster comprises a shaft aligned in a transverse direction of the vehicle seat;
said shaft has ends mounted in said rotary thrust bearings; and
a drive lever is fixedly attached to said shaft, wherein said shaft is rotatable by means of said drive acting on said drive lever.

17. A vehicle seat according to claim 16, further comprising a fork fixedly attached to said shaft, wherein said seat substructure includes a transverse tube aligned in the transverse direction of the seat, said fork being loosely positioned on said transverse tube by said fork bearings being pivotable about the transverse tube.

18. A vehicle seat according to claim 17, wherein said drive of said inclination adjuster includes a spindle as an output shaft and a spindle nut located on said spindle, spindle nut being rotatably mounted on the drive lever.

* * * * *